United States Patent
Zhang et al.

(10) Patent No.: US 12,156,226 B2
(45) Date of Patent: Nov. 26, 2024

(54) PHYSICAL UPLINK SHARED CHANNEL REPETITION WITH DIFFERENT CONFIGURATIONS

(71) Applicant: Apple Inc., Cupertino, CA (US)

(72) Inventors: Yushu Zhang, Beijing (CN); Chunhai Yao, Beijing (CN); Haitong Sun, Cupertino, CA (US); Hong He, San Jose, CA (US); Wei Zeng, Saratoga, CA (US); Dawei Zhang, Saratoga, CA (US); Chunxuan Ye, San Diego, CA (US); Oghenekome Oteri, San Diego, CA (US); Weidong Yang, San Diego, CA (US); Sigen Ye, Whitehouse Station, NJ (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 17/439,375

(22) PCT Filed: Oct. 19, 2020

(86) PCT No.: PCT/CN2020/121884
§ 371 (c)(1),
(2) Date: Sep. 14, 2021

(87) PCT Pub. No.: WO2022/082359
PCT Pub. Date: Apr. 28, 2022

(65) Prior Publication Data
US 2022/0304035 A1    Sep. 22, 2022

(51) Int. Cl.
*H04W 72/23* (2023.01)
*H04L 1/08* (2006.01)

(52) U.S. Cl.
CPC .............. *H04W 72/23* (2023.01); *H04L 1/08* (2013.01)

(58) Field of Classification Search
CPC ................................ H04W 72/23; H04L 1/08
See application file for complete search history.

(56) References Cited

U.S. PATENT DOCUMENTS

| | | | |
|---|---|---|---|
| 2018/0199268 A1* | 7/2018 | Wang | H04L 5/0053 |
| 2019/0342888 A1 | 11/2019 | Hosseini et al. | |
| 2019/0364561 A1 | 11/2019 | Xiong et al. | |
| 2020/0015250 A1 | 1/2020 | Yang et al. | |

(Continued)

FOREIGN PATENT DOCUMENTS

| | | |
|---|---|---|
| CN | 110299976 | 10/2019 |
| CN | 110463066 A | 11/2019 |

(Continued)

OTHER PUBLICATIONS

International Patent Application No. PCT/CN2020/121884, International Search Report and Written Opinion, Mailed on Jul. 15, 2021, 9 pages.

(Continued)

*Primary Examiner* — Brenda H Pham
(74) *Attorney, Agent, or Firm* — Kilpatrick Townsend & Stockton LLP

(57) ABSTRACT

The present application relates to devices and components including apparatus, systems, and methods for physical uplink shared channel transmissions with repetitions on different beams with different configurations.

14 Claims, 11 Drawing Sheets

(56) References Cited

U.S. PATENT DOCUMENTS

| | | | |
|---|---|---|---|
| 2020/0053752 A1 | 2/2020 | Huang et al. | |
| 2020/0163079 A1 | 5/2020 | Choi et al. | |
| 2020/0205150 A1 | 6/2020 | Cheng et al. | |
| 2020/0252185 A1 | 8/2020 | Zhang et al. | |
| 2020/0314817 A1* | 10/2020 | Sun | H04L 5/0094 |
| 2021/0014026 A1 | 1/2021 | Papasakellariou | |
| 2021/0068195 A1 | 3/2021 | Yang et al. | |
| 2021/0084640 A1 | 3/2021 | Kang et al. | |
| 2022/0140859 A1* | 5/2022 | Takeda | H04B 1/713 375/135 |
| 2023/0171045 A1* | 6/2023 | Matsumura | H04L 5/0044 370/329 |
| 2023/0344555 A1* | 10/2023 | Yuan | H04L 5/0091 |
| 2023/0354205 A1 | 11/2023 | Khoshnevisan et al. | |

FOREIGN PATENT DOCUMENTS

| | | |
|---|---|---|
| CN | 110535614 | 12/2019 |
| CN | 111278143 | 6/2020 |
| WO | 2019160846 | 8/2019 |
| WO | 2019200313 | 10/2019 |

OTHER PUBLICATIONS

International Patent Application No. PCT/CN2020/119799, International Search Report and Written Opinion, Mailed on Jun. 29, 2021, 9 pages.

International Patent Application No. PCT/CN2020/119799, Filed on Oct. 2, 2020, 105 pages.

3rd Generation Partnership Project; Technical Specification Group Radio Access Network; NR; Multiplexing and channel coding (Release 16), 3GPP TS 38.212 v16.3.0, Sep. 2020, 152 pages.

3rd Generation Partnership Project; Technical Specification Group Radio Access Network; NR; Radio Resource Control (RRC) protocol specification (Release 16), 3GPP TS 38.331 V16.2.0, Sep. 2020, 921 pages.

3rd Generation Partnership Project; Technical Specification Group Radio Access Network; NR; Physical layer procedures for data, 3GPP TS 38.214 V16.2.0, Sep. 2020, 167 pages.

Qualcomm Incorporated, Enhancements on Multi-TRP for PDCCH, PUCCH and PUSCH, 3GPP TSG-RAN WG 1 Meeting#102-e, R1-2006791, Aug. 17-28, 2020, 14 pages.

ZTE, Multi-TRP enhancements for PDCCH, PUCCH and PUSCH, 3GPP TSG RAN WGl Meeting #102-e , RI-2005455, Aug. 17-28, 2020, 12 pages.

Discussion on Multi-TRP Operation, 3GPP TSG RAN WG1 Meeting #99, R1-1912622, Nov. 22, 2019, 3 pages.

3GPP TS 38.213 V16.2.0, 3rd Generation Partnership Project; Technical Specification Group Radio Access Network; NR; Physical Layer Procedures for Control (Release 16), Jun. 2020, 176 pages.

3GPP TS 38.214 V16.2.0, 3rd Generation Partnership Project; Technical Specification Group Radio Access Network; NR; Physical Layer Procedures for Data (Release 16), Jun. 2020, 164 pages.

3GPP TS 38.331 V16.1.0, 3rd Generation Partnership Project; Technical Specification Group Radio Access Network; NR; Radio Resource Control (RRC) Protocol Specification (Release 16), Jul. 2020, 906 pages.

Le et al., "An Overview of Physical Layer Design for Ultra-Reliable Low-Latency Communications in 3GPP Release 15 and Release 16", Available Online at: arXiv:2002.03713v1, Feb. 10, 2020, 7 pages.

International Patent Application No. PCT/CN2020/119799, International Preliminary Report on Patentability, Apr. 13, 2023, 6 pages.

International Patent Application No. PCT/CN2020/121884, International Preliminary Report on Patentability, May 4, 2023, 6 pages.

Technical Specification, entitled "3rd Generation Partnership Project; Technical Specification Group Radio Access Network; NR; Multiplexing and channel coding (Release 16)," 3GPP TS 38.212 V16.3.0 (Sep. 2020); Keywords 3GPP, New Radio, Layer 1 in 152 pages.

Technical Specification, entitled "3rd Generation Partnership Project; Technical Specification Group Radio Access Network; NR; Physical layer procedures for data (Release 16)," 3GPP TS 38.214 V16.3.0 (Sep. 2020); Keywords 3GPP, New Radio, Layer 1 in 166 pages.

Non-Final Office Action issued in U.S. Appl. No. 17/440,694, dated Mar. 21, 2024 in 14 pages.

Office Action issued in China Application No. CN202080106371.1, dated Jul. 5, 2024 in 10 pages.

* cited by examiner

PHYSICAL UPLINK SHARED CHANNEL REPETITION WITH DIFFERENT CONFIGURATIONS

CROSS-REFERENCE TO RELATED APPLICATIONS

This application is a U.S. National Stage Application of PCT/CN2020/121884, filed Oct. 19, 2020. The disclosure of which is herein incorporated by reference in its entirety for all purposes.

BACKGROUND

Releases 15 and 16 of Third Generation Partnership Project (3GPP) introduce reliability enhancement schemes for physical uplink control channel (PUCCH) and physical uplink shared channel (PUSCH) transmissions. These enhancements include repeatedly transmitting the payloads of the uplink channels.

DETAILED DESCRIPTION

Figure 1:
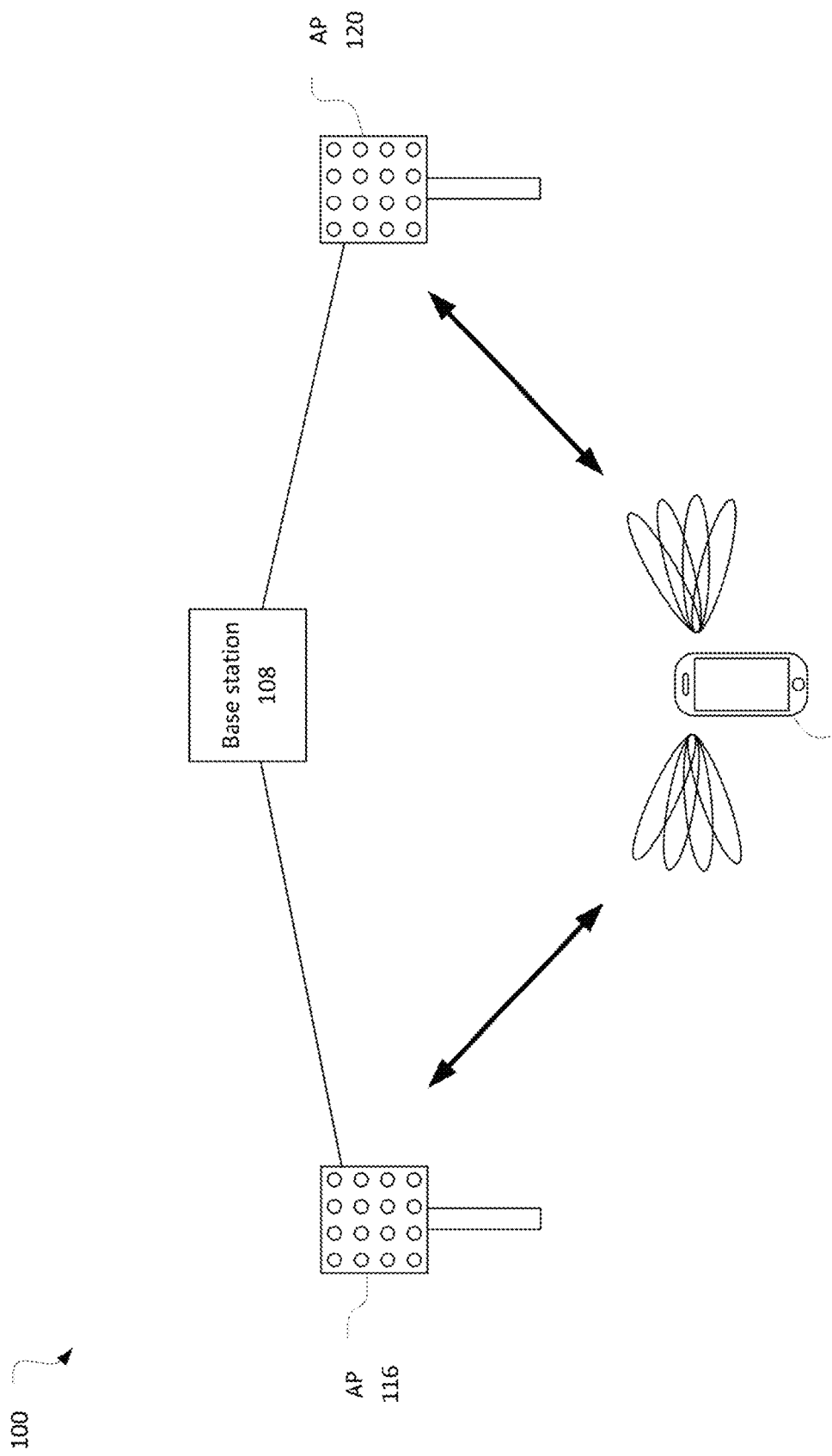
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a base station 108. The base station 108 may provide one or more wireless serving cells, for example, 3GPP New Radio "NR" cells, through which the UE 104 may communicate with the base station 108.

The UE 104 and the base station 108 may communicate over an air interface compatible with 3GPP technical specifications such as those that define Fifth Generation (5G) NR system standards. The base station 108 may be a next-generation—radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

The base station 108 may be coupled with one or more distributed antenna panels (APs), for example, AP 116 and AP 120. The distributed APs 116/120 may be implemented in transmit-receive points (TRPs) or other devices. In general, the base station 108 may perform the majority of the operations of a communication protocol stack, including scheduling, while the APs 116/120 act as distributed antennas. In some embodiments, the APs 116/120 may perform some lower-level operations of the communication protocol stack (for example, analog physical (PHY) layer operations).

The base station 108 may use the APs 116/120 to geographically separate points at which a signal may be transmitted to, or received from, the UE 104. This may increase flexibility of using multiple-input, multiple-output and beamforming enhancements for communicating with the UE 104. The APs 116/120 may be used to transmit downlink transmissions to the UE 104 and receive uplink transmissions from the UE 104. In some embodiments, the distributed transmit/receive capabilities provided by the APs 116 and 120 may be used for coordinated multipoint or carrier aggregation systems from one or more base stations.

While the network environment 100 illustrates one base station 108 communicating with the UE 104 through APs 116/120, in various embodiments, the network environment 100 may include a number of other network elements (for example, base stations, TRPs, eNBs, etc.) to facilitate a radio access network connection for the UE 104.

The base station 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface.

The APs 116 and one or more antenna panels on the UE 104 may include arrays of antenna elements that allow receive or transmit beamforming. Beamforming may improve the uplink and downlink budgets by determining and using uplink and downlink beams that increase antenna gain and overall system performance. The UE 104 and the base station 108 may determine desired uplink-downlink beam pairs using beam management operations based on reference signal measurements and channel reciprocity assumptions.

In the downlink direction, the base station 108 may send synchronization signal blocks (SSBs) and channel state information—reference signals (CSI-RSs) that are measured by the UE 104 to determine the desired downlink beam pair for transmitting/receiving physical downlink control channel (PDCCH) and physical downlink shared channel (PDSCH) transmissions. In some embodiments, the network elements may assume uplink/downlink beam correspondence and use the desired downlink beam pair as the desired uplink beam pair for PUSCH and PUCCH transmissions. In some embodiments, beam pairs may be independently determined for the uplink direction based on sounding reference signals (SRSs) transmitted by the UE 104. In various embodiments, beam management may include different stages such as initial acquisition of the uplink and downlink beams, and later refinement of the uplink and downlink beams.

The PUSCH may be used to transfer user data in the user plane and signaling radio bearer (SRB) messages in the control plane. The PUSCH may also be used to transfer various control information such as, for example, buffer status reports, cell-radio network temporary identifiers (C-RNTIs), configured grant configuration, and power headroom reports.

The base station 108 may transmit, in PDCCH, downlink control information (DCI) to the UE 104 to schedule the UE 104 to transmit a PUSCH transmission repeatedly by a plurality of beams. DCI corresponds to Physical (PHY) layer signaling. 3GPP has defined a number of DCI formats to accommodate particular PDCCH payloads. For example, DCI format 0_0 may be used for scheduling one PUSCH in one cell (with a relatively smaller payload and increased redundancy to be used when coverage deteriorates); DCI format 0_1 may be used for scheduling one or more PUSCH transmissions in one cell or indicating configured grant downlink feedback information; DCI format 0_2 may be used for scheduling one PUSCH transmission in one cell; and DCI format 2_2 may provide transmit power control commands for PUCCH and the PUSCH. Other DCI format are also defined.

The base station 108 may transmit the PDCCH using resource elements that belong to a control resource set (CORESET). A search space configuration may refer to a particular CORESET to define a search space, for example, a specific set of resource blocks and symbols where the UE 104 is to attempt to decode the PDCCH.

The transport block (TB) may be the packet of data transmitted by a PUSCH transmission. When PUSCH repetitions are used, the same TB may be transmitted in each repetition. After the UE 104 receives an uplink allocation, it must determine the transport block size. Likewise, when attempting to decode received data, the base station 108 must also determine the same transport block size. To determine the TB size, a network element may determine a number of resource elements that are available for data transfer within a bandwidth of a single resource block. The number of resource elements available for data transfer may be based on frequency allocation (for example a number of resource blocks) and time allocation (for example, a transmission duration) for the uplink allocation. The TB size determination may further be based on the modulation order and code rate that are to be used for the uplink transmission.

Figure 2:
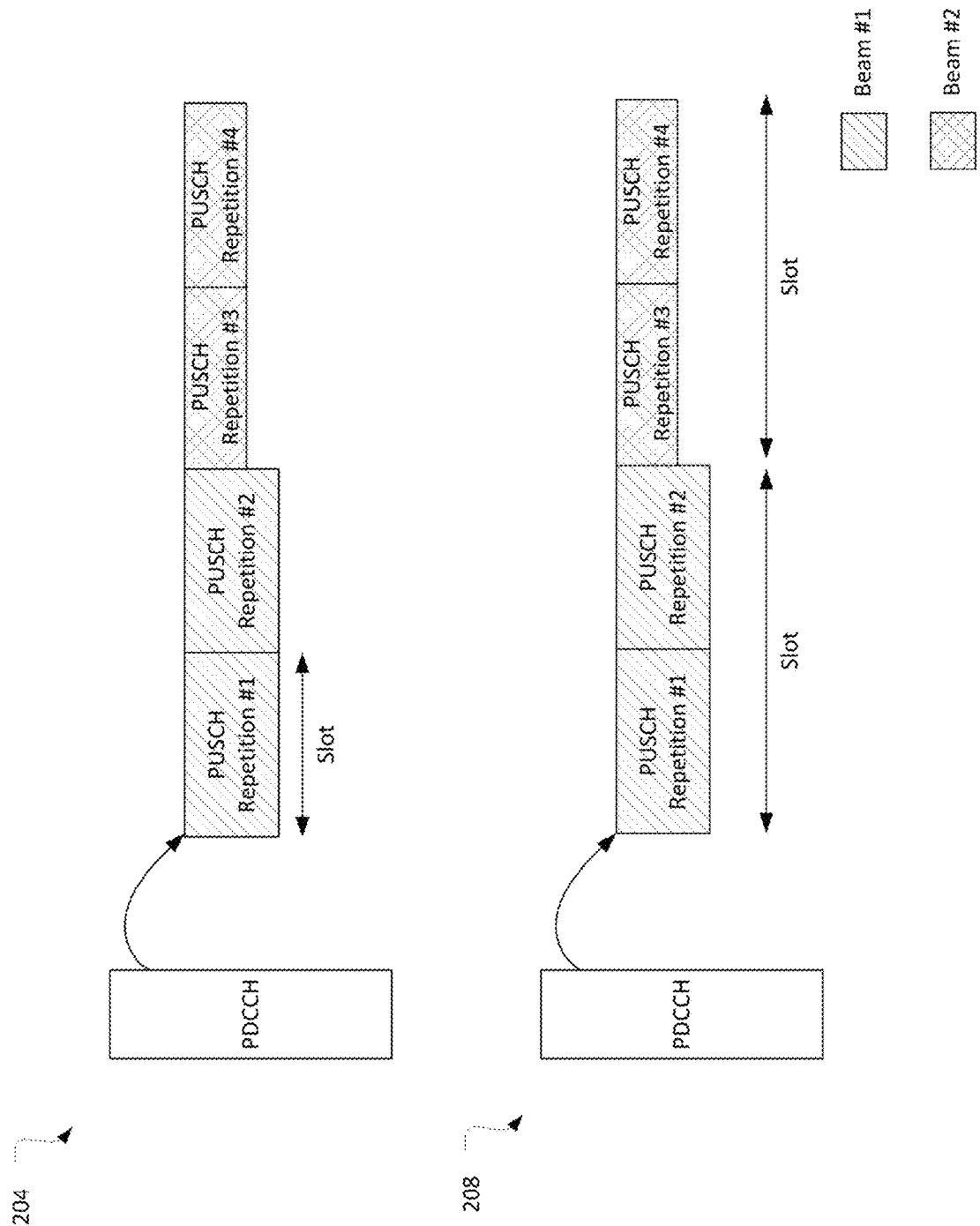
FIG. 2 includes signaling diagrams illustrating downlink control information scheduling PUSCH transmissions with repetitions in a plurality of beams in accordance with some embodiments.

FIG. 2 illustrates signaling diagrams in accordance with some embodiments. In particular, signaling diagram 204 illustrates a PDCCH scheduling a PUSCH transmission with repetition type A and signaling diagram 208 is shown with a PDCCH scheduling a PUSCH transmission with repetition type B.

In PUSCH repetition type A, each PUSCH repetition may be mapped to a consecutive slot. For example, a first PUSCH repetition may be mapped to a first slot, a second PUSCH repetition may be mapped to a second slot that immediately follows the first slot, and so on. In PUSCH repetition type B, each PUSCH repetition may be mapped to consecutive symbols. The consecutive symbols may be in one or more slots. Signaling diagram 208 illustrates the consecutive symbols being transmitted over first and second slots.

In contrast to Release 15 and 16, in which all PUSCH repetitions were transmitted from a single beam, the signaling diagrams 204 and 208 illustrate the PUSCH transmitted with two different beams, for example, beam #1 and beam #2. In various embodiments, the UE 104 may transmit the PUSCH repeatedly with a number of different beams. In some embodiments, N beams may be scheduled for M repetitions, with M being greater than or equal to N. The repetitions of different beams may be transmitted to the same or different TRPs.

In various embodiments, the PUSCH repetitions transmitted on different beams may use different time/frequency resources configured by RRC or granted by a single downlink control information (DCI) or multiple DCIs to transmit the same PUSCH payload. The different beams used for transmitting the PUSCH repetitions may be defined by different SRS resource indicators (SRIs), transmission precoder matrix indicators (TPMIs), or power control parameters.

Figure 3:
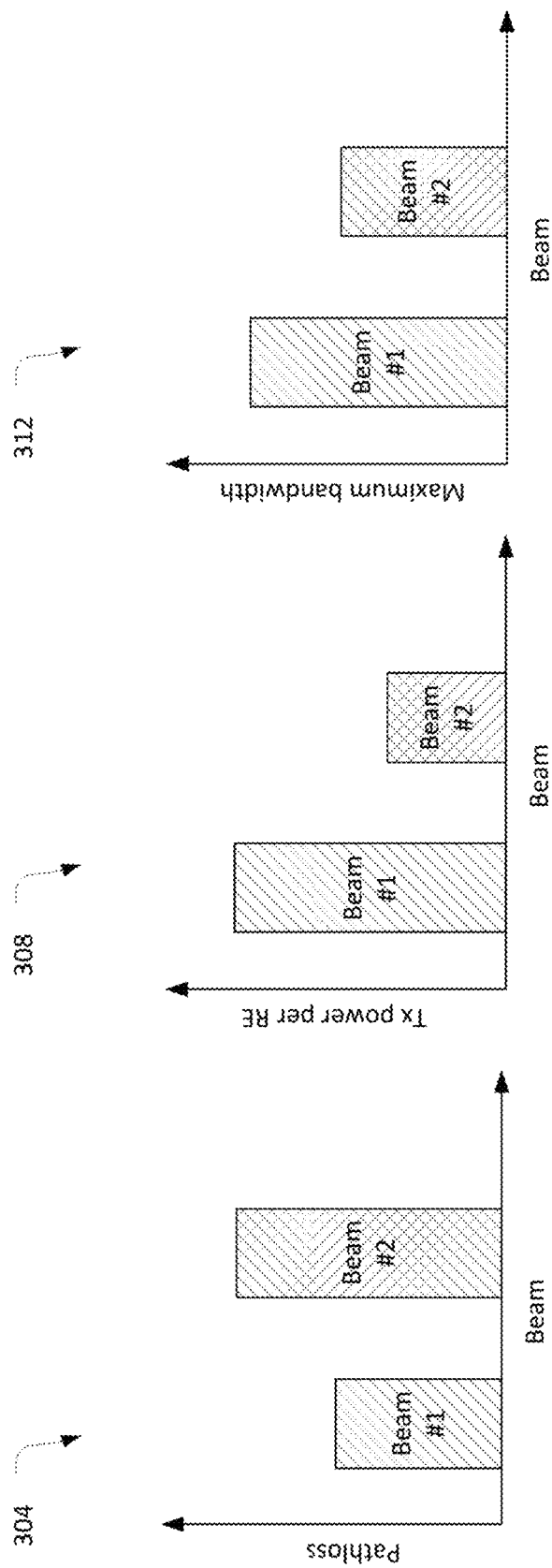
FIG. 3 illustrates comparative signaling metrics among a plurality of beams that carry repetitions of a PUSCH in accordance with some embodiments.

Transmitting the PUSCH repetitions with different beams may result in signaling metrics that differ from one set of repetitions to another. FIG. 3 illustrates comparative signaling metrics in accordance with some embodiments. For example, configuring different power control parameters for repetitions with different beams may result in beam #1 and beam #2 having different pathloss, as shown in graph 304, and transmit powers per resource element, as shown in graph 308. This may also lead to different power headrooms. Different transmit power may also lead to a different maximum bandwidths as shown in graph 312. Still further, SINR for each beam may also be different. This may lead to different modulation order and coding rates for different beams.

In some embodiments, it may be desirable to transmit PUSCH repetitions with different configurations to account for the different power control parameters, pathloss, and SINR that may be associated with the different beams. Embodiments describe different configurations for repeated PUSCH transmissions. Various aspects include control signaling for: single-DCI based PUSCH repetitions; two-stage DCI based PUSCH repetitions; and multi-DCI based PUSCH repetitions.

In some embodiments, the base station 108 may transmit a single DCI to schedule one PUSCH transmission (for example, one transport block) via a number of repetitions in a plurality of beams. Single-DCI based PUSCH repetitions may be described as follows in accordance with some embodiments.

The single DCI may be DCI format 0_1, 0_2, or a new DCI format. The single DCI may provide indications of some or all of the following information: frequency-domain resource allocation (FDRA) for the repetitions with different beams; time-domain resource allocation (TDRA) for the repetitions with different beams; or modulation and coding scheme (MCS) for the repetitions with different beams.

The single DCI may include one or more FDRA fields to allocate the frequency domain resources (for example, a set of resource blocks (RBs)) for the PUSCH transmission. In some embodiments, the single DCI may include a frequency domain resources assignment field used to specify the set of allocated resource blocks. The FDRA information signaled in the single DCI may be based on an RRC configuration of the UE 104. For example, the base station 108 may configure the UE with resource allocation type 0 or type 1 (or allow dynamic switching between the two). For resource allocation type 0, the DCI may include a bitmap to allocate specific resource block groups (RBGs). An RBG may be a set of contiguous virtual resource blocks. For resource allocation type 1, the DCI may include a resource indication value to allocate a contiguous set of virtual resource blocks.

In some embodiments, the FDRA for different beams may be indicated by separate fields in the single DCI. For example, single DCI may include a first field to configure beam #1 with a first FDRA configuration, and a second field to configure beam #2 with a second FDRA configuration. Alternatively, the FDRA for different beams may be indicated jointly by a single field. For example, the single DCI may include one FRDA field that configures beam #1 with the first FDRA configuration and configures beam #2 with the second FDRA configuration.

In some embodiments, the single DCI may include an indication of frequency hopping for the PUSCH transmission. For example, the single DCI may include a frequency hopping flag that indicates whether or not frequency hopping is to be applied to a resource allocation. In some embodiments, the frequency hopping flag may be configured per beam or across all beams.

Figure 4:
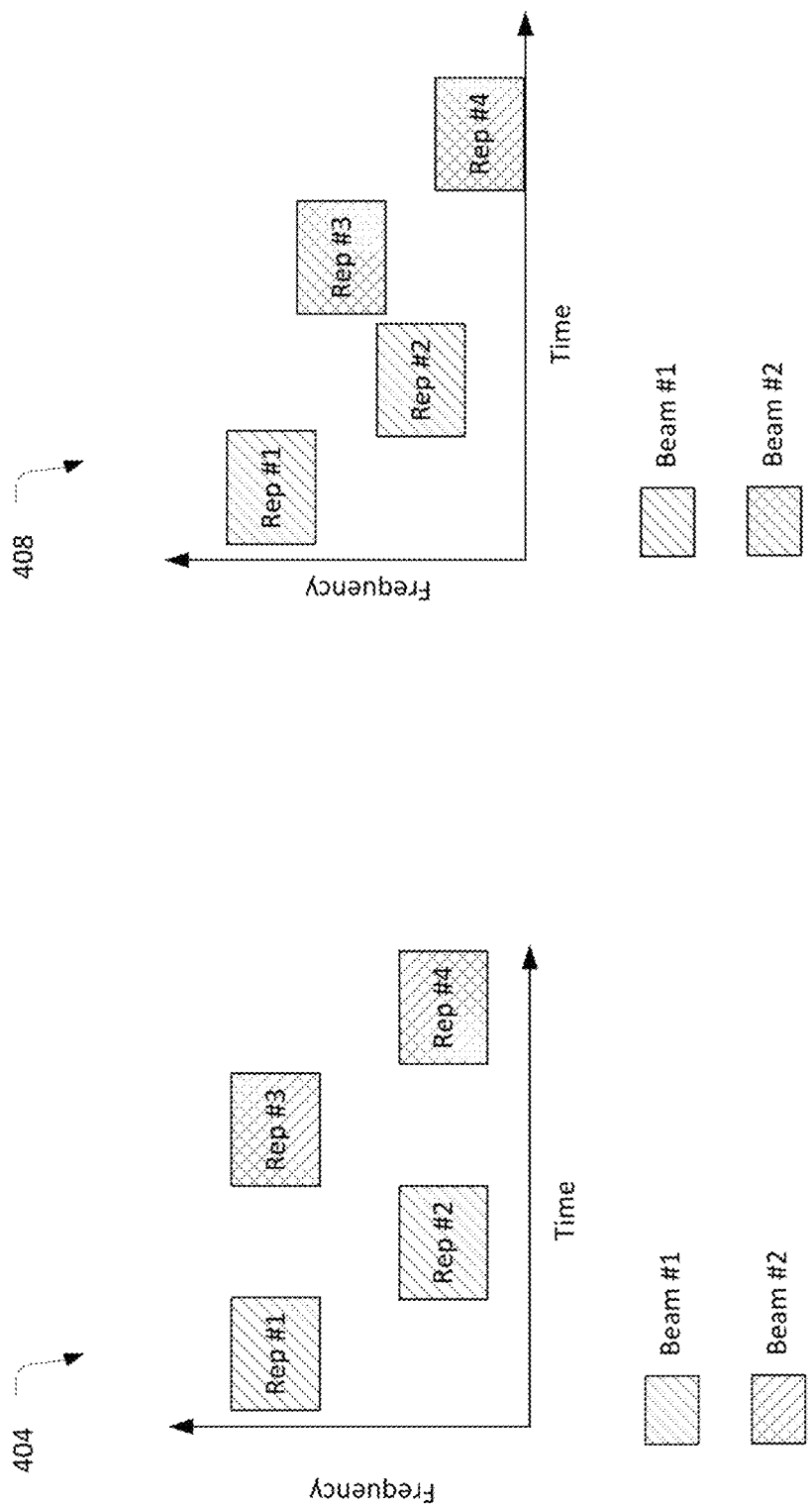
FIG. 4 includes signaling diagrams illustrating frequency hopping among a plurality of beams that carry repetitions of a PUSCH in accordance with some embodiments.

FIG. 4 illustrates frequency-hopping configurations for PUSCH repetitions with different beams in accordance with some embodiments. In particular, FIG. 4 illustrates a frequency-hopping configuration 404 and a frequency hopping configuration 408.

The frequency-hopping configuration 404 illustrates frequency hopping being applied for repetitions within a same beam. For example, first repetitions (repetition #1 and #2) of beam #1 have a frequency hopping pattern that provides that the first repetitions are transmitted in different frequencies from one another; and the second repetitions (repetition #3 and #4) of beam #2 have a frequency hopping pattern that provides that the second repetitions are transmitted in different frequencies from one another. Because the hopping patterns are independent for the repetitions, some of the first repetitions may overlap and frequency with some of the second repetitions. For example, repetition #1 of beam #1 and repetition #3 of beam #2 completely overlap in frequency as do repetition #2 of beam #1 and repetition #4 of beam #2.

In some embodiments, frequency hopping applied for repetitions within a same beam, such as that shown above with respect to frequency-hopping configuration 404, may be used if a size of the allocated frequency is different for repetitions of the different beams.

The frequency-hopping configuration 408 illustrates frequency hopping being applied for repetitions with different beams. For example, one frequency hopping pattern is applied to all of the first repetitions and the second repetitions. Thus, there is no complete frequency overlap with respect to any two repetitions of the plurality of repetitions.

In some embodiments, frequency hopping may be applied for repetitions with different beams, such as that shown above with respect to frequency-hopping configuration 408, may be used if a size of the allocated frequency is the same for repetitions of the different beams.

In some embodiments, the single DCI may include one or more TDRA fields to allocate time domain resources for the PUSCH transmission. In some embodiments, the single DCI may include a time domain resource assignment field to define a pointer toward a row within a lookup table that is configured by 3GPP technical specification or RRC signaling. The lookup table may define a slot offset, a PUSCH mapping type, a starting symbol, and a number of allocated symbols. The PUSCH mapping types may be mapping type A or mapping type B and may determine a number of allowed combinations of PUSCH starting symbol and lengths for normal and extended cyclic prefixes.

In some embodiments, the TDRA for different beams may be indicated in a single DCI by separate fields or jointly by a single field. For joint indication, an additional starting symbol index or symbol length for the other repetitions with different beams may be indicated by RRC. For example, the PUSCH TDRA information element (IE) may be updated as follows.

```
PUSCH-TimeDomainResourceAllocationNew ::= SEQUENCE {
    k2                              INTEGER (0..32)                OPTIONAL,
--Need S
    MappingType                     ENUMERATED {typeA, typeB}      OPTIONAL,
--Cond RepTypeA
    startSymbolAndLength            INTEGER (0..127)               OPTIONAL,
--Cond RepTypeA
    startSymbol                     INTEGER (0..13)                OPTIONAL,
--Cond RepTypeB
    length                          INTEGER (0..14)                OPTIONAL,
--Cond RepTypeB
    additionalStartSymbolAndLength  INTEGER (0..127)               OPTIONAL,
--Cond RepTypeA
    additionalStartSymbol           INTEGER (0..13)                OPTIONAL,
--Cond RepTypeB
    additionalLength                INTEGER (0..14)                OPTIONAL,
--Cond RepTypeB
    numberOfRepetitions             ENUMERATED {n1, n2, n4, n7, n12, n16}
    ...
}
```

The values of the TDRA fields in the single DCI may be defined by the PUSCH TDRA IE. The additional start symbol and length value for repetition type A; additional start symbol for repetition type B, and additional length value for repetition type B are added to allow flexibility of defining separate TDRAs for first repetitions (of first beam) and second repetitions (of second beam). In various embodiments, more than one additional set of start symbol/length values may be added to allow for signaling of PUSCH transmission with repetitions across more than two beams.

To provide the separate-field indication, the single DCI may have a plurality of time domain resource assignment fields that respectively correspond to the plurality of beams that carry PUSCH repetitions.

In some embodiments, the single DCI may include one or more fields to indicate MCSs for the PUSCH transmission. In some embodiments the fields may indicate a pointer to a row within a relevant MCS lookup table. In some embodiments, the MCS lookup table may be similar to Table 1 shown below for PUSCH with transform precoding and 64 quadrature amplitude modulation (QAM).

TABLE 1

| MCS Index IMCS | Modulation Order Qm | Target code rate R × 1024 | Spectral efficiency |
|---|---|---|---|
| 0 | q | 240/q | .2344 |
| 1 | q | 314/q | .3066 |
| 2 | 2 | 193 | .3770 |
| 3 | 2 | 251 | .4902 |
| 4 | 2 | 308 | .6016 |
| 5 | 2 | 379 | .7402 |
| 6 | 2 | 449 | .8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

In other embodiments, other tables may be used including those defined for other QAM, for example, 256 QAM, or for low-spectral efficiency. In some embodiments, the tables and definitions may be similar to those described in 3GPP TS 38.214 v16.3.0 (2020 Oct. 2).

In some embodiments, the single DCI may include MCS indications for N beams. In some embodiments, the indications may be based on normal MCS or reserved MCS. For example, referring to Table 1, a normal MCS indication may be a five-bit value that corresponds to one of MCS indices 0-27. A reserved MCS indication may be a two-bit value that corresponds to one of MCS indices 28-31.

In one option, the single DCI may include an indication for one normal MCS and indications for N−1 reserved MCSs. The one normal MCS may correspond to the repetitions of a first beam, while the N−1 reserved MCSs may respectively correspond to the repetitions of the remaining N−1 beams.

As discussed above, the TB size may be based on the modulation order, code rate, and uplink resource allocation (for example, number of resource elements available for the transmission). In some embodiments, to facilitate decoding of the PUSCH transmission, it may be desirable for the TB size to remain constant across all the repetitions. Thus, in the first option, the TB size for all of the repetitions may be based on the one normal MCS and the uplink resource allocation for the repetitions of the first beam. The modulation order for the repetitions transmitted by the remaining (N−1) beams may be selected based on the respective reserved MCS indications of the DCI.

In a second option, one normal MCS may be used. The TB size for each repetition may be selected based on the normal MCS and uplink resource allocation for the repetitions of the first beam. The modulation order for the repetitions of the other beams may also be based on the indicated normal MCS.

In a third option, N normal MCSs may be used. The TB size for all the repetitions may be selected based on a normal MCS and uplink resource allocation for the repetitions of the first beam. The modulation order for the repetitions transmitted by the remaining N−1 beams may be selected based on the respective N−1 normal MCS indications of the DCI.

The PUSCH transmission may be transmitted with an uplink phase tracking reference signal (PT-RS) that allows the base station 108 to estimate and subsequently compensate for both phase noise and frequency offset. The PT-RS time domain pattern depends on an MCS configured for the uplink transmission. See, for example, section 6.2.3.1 of TS 38.214 v16.3.0 (2020-09). In some embodiments, for the first and second option, the PT-RS time domain pattern may be determined by the normal MCS for the repetitions of the first beam.

Figure 5:
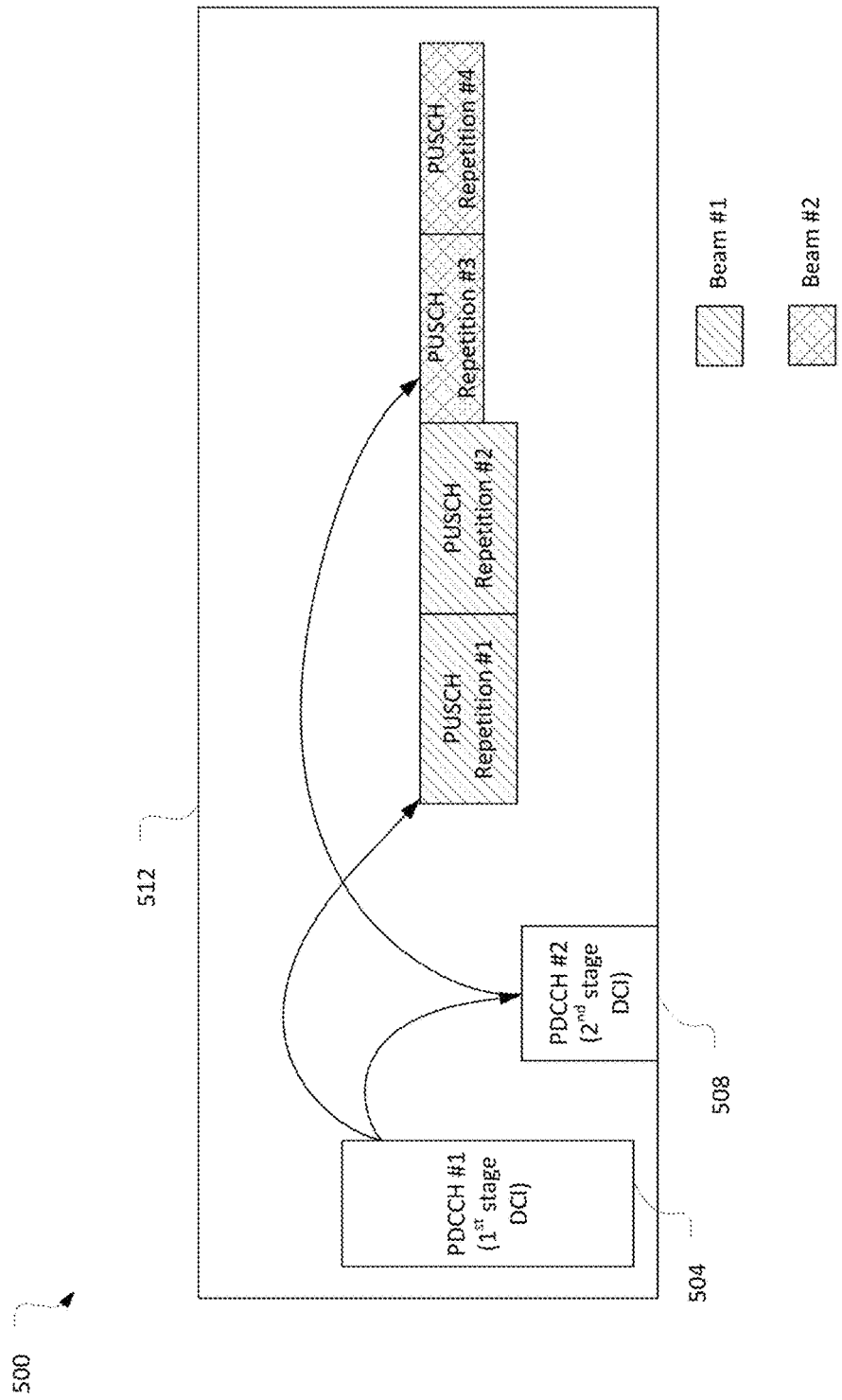
FIG. 5 is a signaling diagram illustrating two-stage downlink control information in accordance with some embodiments.

FIG. 5 is a signaling diagram 500 that illustrates two-stage DCI in accordance with some embodiments. The base station 108 may transmit a two-stage DCI to schedule a PUSCH transmission with repetitions in a plurality of beams (for example, N beams). In particular, the base station 108 may transmit a first PDCCH having first-stage DCI 504 that may be used to provide control signaling for first-beam repetitions (for example, PUSCH repetition #1 and PUSCH repetition #2). The first-stage DCI 504 may also indicate existence of second PDCCH having second-stage DCI 508. In some embodiments, the first-stage DCI 504 may also indicate a location of the second-stage DCI 508.

The second-stage DCI 508 may be used to provide control signaling for repetitions on beams after the first-beam repetitions. As shown, the second-stage DCI 508 may provide control signaling for second-beam repetitions (for example, PUSCH repetition #3 and PUSCH repetition #4). However, in other embodiments, the second-stage DCI 508 may include control signaling for repetitions on additional beams.

In various embodiments, the control signaling for the second-beam repetitions may include signaling to configure FDRA, TDRA, or MCS for the second-beam repetitions.

A first option for signaling FDRA for the second-beam repetitions may be to include an indication that identifies a frequency resource within the whole bandwidth. For example, the whole bandwidth may be defined based on a bandwidth part 512 in which the second-beam repetitions are disposed. The FDRA indication of this option may provide the UE 104 with sufficient information to locate the second-beam repetitions within the bandwidth part 512. This option may allow the flexibility of scheduling the second repetitions in portions of the frequency bandwidth that are not encompassed by the frequency bandwidth of the first-beam repetitions.

A second option for signaling FDRA for the second-beam repetitions may be to include an indication that identifies a frequency resource within an allocated bandwidth for the first-beam repetitions. For example, the first-beam repetitions may be transmitted on a first plurality of subcarriers. In this option, the FDRA indication for frequency allocation for the second-beam repetitions may indicate a subset of the first plurality of subcarriers that is to be used for the second-beam repetitions. In some embodiments, the FDRA for the second-beam repetitions may be provided as an offset from the FDRA for the first-beam repetitions. In this instance, the FDRA for the second-beam repetitions may be considered a differential signaling embodiment.

In a first option for signaling TDRA for the second-beam repetitions, only a different length may be indicated. For example, TDRA control signaling for the first-beam repetitions may include both starting symbol and length values for the first-beam repetitions. The TDRA control signaling for the second-beam repetitions may thereafter only include a length value. In some embodiments, the second-beam repetitions may be determined to start immediately after the first-beam repetitions. Thus, a starting symbol value may not need to be transmitted by the second-stage DCI 508.

In a second option for signaling TDRA for the second-beam repetitions, both starting symbol and length values may be indicated. These embodiments may allow some flexibility for when the second-beam repetitions to start. For example, the second-beam repetitions may not need to start immediately after the first-beam repetitions. Further, in some embodiments, separately signaling both the starting symbol and length values in the second-stage DCI 508 may increase reliability. For example, if the signaling for the TDRA of the first-beam is improperly decoded, the signaling of the TDRA of the second-beam repetitions may provide sufficient information to independently receive the second-beam repetitions.

In a first option for signaling MCS for the second beam repetitions, the MCS may be indicated based on a reserved MCS. For example, as discussed above, a two-bit MCS may be provided to indicate one of the reserved MCSs (corresponding to MCS indices 28-31 of Table 1 in accordance with some embodiments) in order to convey a modulation order that is to be used for the second-beam repetitions.

In a second option for signaling MCS for the second beam repetitions, the MCS may be indicated based on a normal MCS. For example, as also discussed above, a five-bit MCS may be provided to indicate one of the normal MCSs (corresponding to MCS indices 1-27 of Table 1 in accordance with some embodiments) in order to convey the modulation order that is to be used for the second-beam repetitions.

The second-stage DCI 508 may be carried by separate search space (SS)/CORESET as the first-stage DCI 504. In this embodiment, the UE 104 may perform separate blind decoding attempts to receive the PDCCH #1 and PDCCH #2. In another option, the same SS/CORESET may carry the first-stage DCI 504 and the second-stage DCI 508. In this embodiment, the UE 104 may perform one blind decoding attempt to receive both PDCCHs. In still another option, second-stage DCI 508 may be carried by a resource indicated by the first-stage DCI 504. In this embodiment, the first-stage DCI 504 may schedule the second-stage DCI 508. Therefore, the UE 104 may not need to perform a blind decoding attempt to receive the second-stage DCI 508.

In some embodiments, the base station 108 may use multi-DCI to schedule PUSCH repetitions with multiple beams. For example, a PUSCH transmission with repetitions on N beams may be indicated by N DCIs.

The base station 108 may include an RRC parameter that enables multi-DCI operation. Providing this RRC parameter may inform the UE 104 that a plurality of DCIs respectively corresponds to a plurality of repetitions sets on different beams for one PUSCH transmission, as opposed to a plurality of transmissions of the entire PUSCH transmission (for example, initial transmission and retransmission based on negative acknowledgement) or other PUSCH transmissions.

When multi-DCI is enabled, the N DCIs may be transmitted before the first PUSCH repetition scheduled by the first DCI.

In some embodiments, the N DCIs may include common information that allows the UE 104 to determine the plurality of DCIs respectively correspond to a plurality of repetition sets on different beams rather than retransmissions of the PUSCH transmission or transmission of another PUSCH transmission. This common information may include, for example, an uplink (UL)/supplementary UL indicator; bandwidth part indicator; hybrid automatic repeat request (HARQ) process number; uplink-shared channel (UL-SCH) indicator; or new data indicator.

Similar to above embodiments, the UE 104 may transmit the same TB across all repetitions scheduled by the N DCIs. The size of the TB may be determined based on one of the following options.

In a first option, the TB size may be determined by the first DCI, and in other DCIs, only reserved MCSs may be indicated. For example, the first DCI may include a five-bit MCS indication and an uplink resource allocation upon which the TB size may be determined. The subsequent DCIs may include two-bit MCS indications that may be used to determine the modulation order for the repetitions not indicated by the first DCI. The UE 104 may identify the first DCI as the first DCI by presence of the five-bit MCS.

Alternatively, normal MCSs may be indicated (by five-bit MCS indications) in other DCIs. The normal MCSs in the DCIs other than the first DCI may only be used to indicate the modulation order for a respective repetition set. In order to clarify which DCI is the first DCI (and, therefore, which DCI is the basis of the TB size determination) the base station 108 may provide an indicator. In some embodiments, the indicator may be in all the DCI (indicating whether DCI is first DCI or not), only in the first DCI (indicating that it is the first DCI), or only in the DCI that are not the first DCI (indicating that they are not the first DCI). In some embodiments, the indicator may be based on the DCI format used. For example, the first DCI may use a first DCI format while the other DCIs use a second DCI format. In some embodiments, the indicator may be configured by higher-layer signaling.

As the UE 104 may rely on the first DCI to determine the TB size, it may not transmit the other PUSCH repetitions if it fails to decode the first DCI correctly in accordance with some embodiments.

In a second option, the TB size may be explicitly indicated by DCI. Thus, the DCI may provide a direct indication of the TB size and the TB size may not need to be calculated at the UE 104 based on the MCS and uplink resource allocations. In this embodiment, each DCI may only need to indicate a reserved MCS using the two-bit MCS indications.

Figure 6:
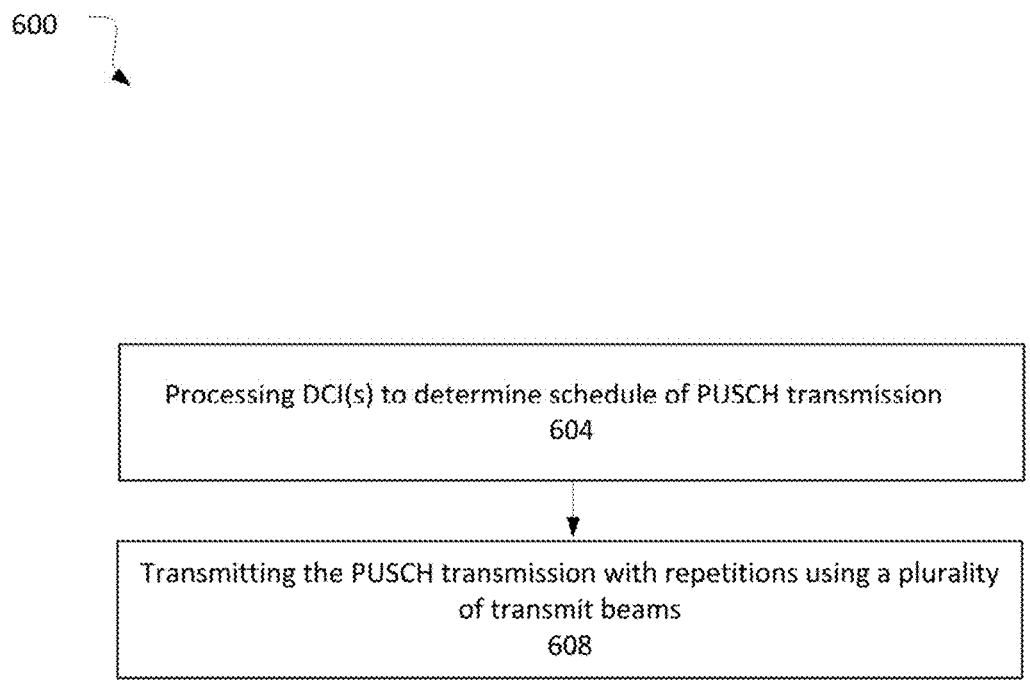
FIG. 6 illustrates an operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE such as, for example, UE 104 or UE 1000; or components thereof, for example, baseband processor 1004A.

The operation flow/algorithmic structure 600 may include, at 604, processing DCI(s) to determine a schedule of a PUSCH transmission. The DCI(s) may include single DCI, two-stage DCI, or multi-DCI that may be used to schedule a PUSCH transmission with a plurality of repetitions on at least two transmit beams.

In some embodiments, a plurality of repetition sets may correspond to a respective plurality of transmit beams. The repetition sets may be configured differently. In some embodiments, the different configurations may include different FDRA configurations, TDRA configurations, or MCS configurations. In some embodiments, the DCI(s) received at 604 may indicate, alone or in conjunction with other control signaling (for example, RRC configuration signaling), the different configurations for the different repetition sets.

Different FDRA configurations may include, for example, different frequency hopping patterns configured among the different repetition sets, different frequency bandwidth allocations among the different repetition sets, etc.

Different TDRA configurations may include, for example, different start symbol or length values for the different repetition sets. In some embodiments, the DCI may include a joint indication of the different TDRA configurations by referencing an RRC configuration. In some embodiments, the RRC configuration may be based on a TDRA IE provided to the UE by RRC signaling. In other embodiments, the DCI may include a plurality of time domain resource assignment fields to indicate the different start symbol or length values for the different repetition sets.

Different MCS configurations may include different modulation orders for the different repetition sets. In some embodiments, DCI may indicate normal/reserved MCSs for the different repetition sets. A TB size for all the repetitions may be determined based on an MCS and uplink resource allocation for a first repetition set, while modulation orders for the other repetition sets may be based on respective MCS values.

The operation flow/algorithmic structure 600 may further include, at 608, transmitting the PUSCH transmission with repetitions using a plurality of transmit beams. The UE may transmit the PUSCH transmission with the repetition sets on respective transmit beams according to their different configurations.

Figure 7:
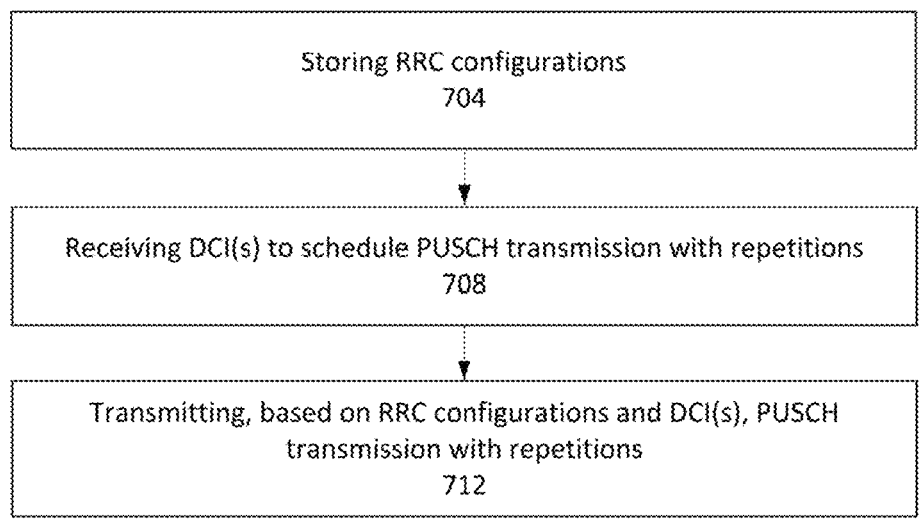
FIG. 7 illustrates another operational flow/algorithmic structure in accordance with some embodiments.

FIG. 7 may include an operation flow/algorithmic structure 700 in accordance with some embodiments. The operation flow/algorithmic structure 700 may be performed or implemented by a UE such as, for example, UE 104 or 1000; or components thereof, for example, baseband processor 1004A.

The operation flow/algorithmic structure 700 may include, at 704, storing RRC configurations. The RRC configurations may be based on RRC signaling received from a base station. The RRC signaling may include any of a variety of configuration IEs including, for example, a PUSCH configuration IE. In some embodiments, the RRC signaling may include a PUSCH-TDRA IE to configure start and symbol length values that may be available to a plurality of repetition sets. In some embodiments, the RRC signaling may include a parameter to enable multi-DCI operation.

The operation flow/algorithmic structure 700 may further include, at 708, receiving DCI(s) to schedule PUSCH transmission with repetitions. Similar to that discussed above with respect to 604, the DCI(s) may include single DCI, two-stage DCI, or multi DCI. The DCI(s) may schedule the PUSCH transmission with repetition sets corresponding to respective transmit beams.

The operation flow/algorithmic structure 700 may further include, at 712, transmitting, based on the RRC configurations and DCI(s), the PUSCH transmission with repetitions. The repetition sets of the PUSCH transmission may be transmitted on respective transmit beams with different configurations as described herein.

Figure 8:
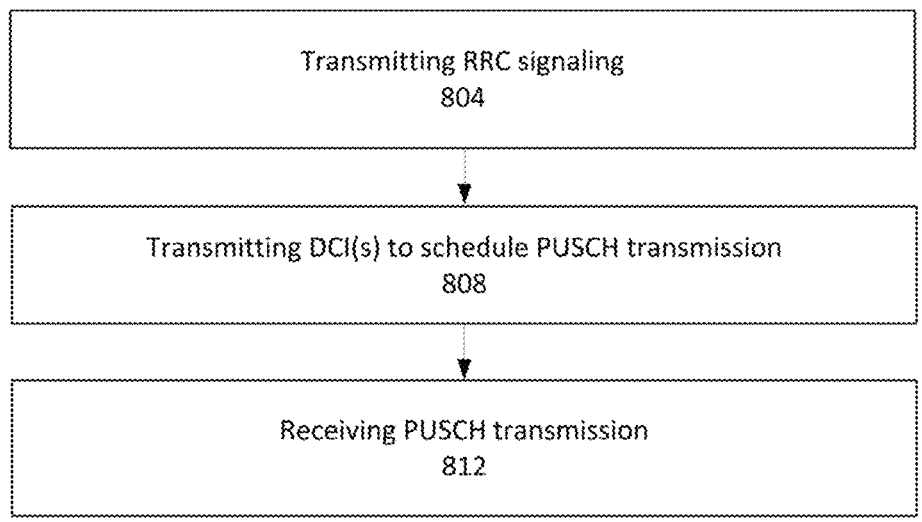
FIG. 8 illustrates another operational flow/algorithmic structure in accordance with some embodiments.

FIG. 8 may include an operation flow/algorithmic structure 800 in accordance with some embodiments. The operation flow/algorithmic structure 800 may be performed or implemented by a base station such as, for example, base station 108 or gNB 1100; or components thereof, for example, baseband processor 1104A.

The operation flow/algorithmic structure 800 may include, at 804, transmitting RRC signaling. The RRC signaling may include any of a variety of configuration IEs including, for example, a PUSCH configuration IE. In some embodiments, the RRC signaling may include a PUSCH-TDRA IE to configure start and symbol length values that may be available to a plurality of repetition sets. In some embodiments, the RRC signaling may include a parameter to enable multi-DCI operation.

The operation flow/algorithmic structure 800 may further include, at 808, transmitting DCI(s) to schedule PUSCH transmission. Similar to that discussed above with respect to 604, the DCI(s) may include single DCI, two-stage DCI, or multi DCI. The DCI(s) may schedule the PUSCH transmission with repetition sets corresponding to respective transmit beams. The different repetition sets may be configured (through DCI/RRC) with different time/frequency/MCS configurations The operation flow/algorithmic structure 800 may further include, at 812, receiving the PUSCH transmission. The base station may receive the PUSCH transmission with different repetition sets transmitted with different transmit beams. In some embodiments, some repetition sets may be directed to, or received by, a particular network element (for example, TRP), while other repetition sets are directed to, or received by, a different network element. In these embodiments, the network elements (for example, TRPs) may provide the repetition sets to a centralized controller of the base station for further processing.

Figure 9:
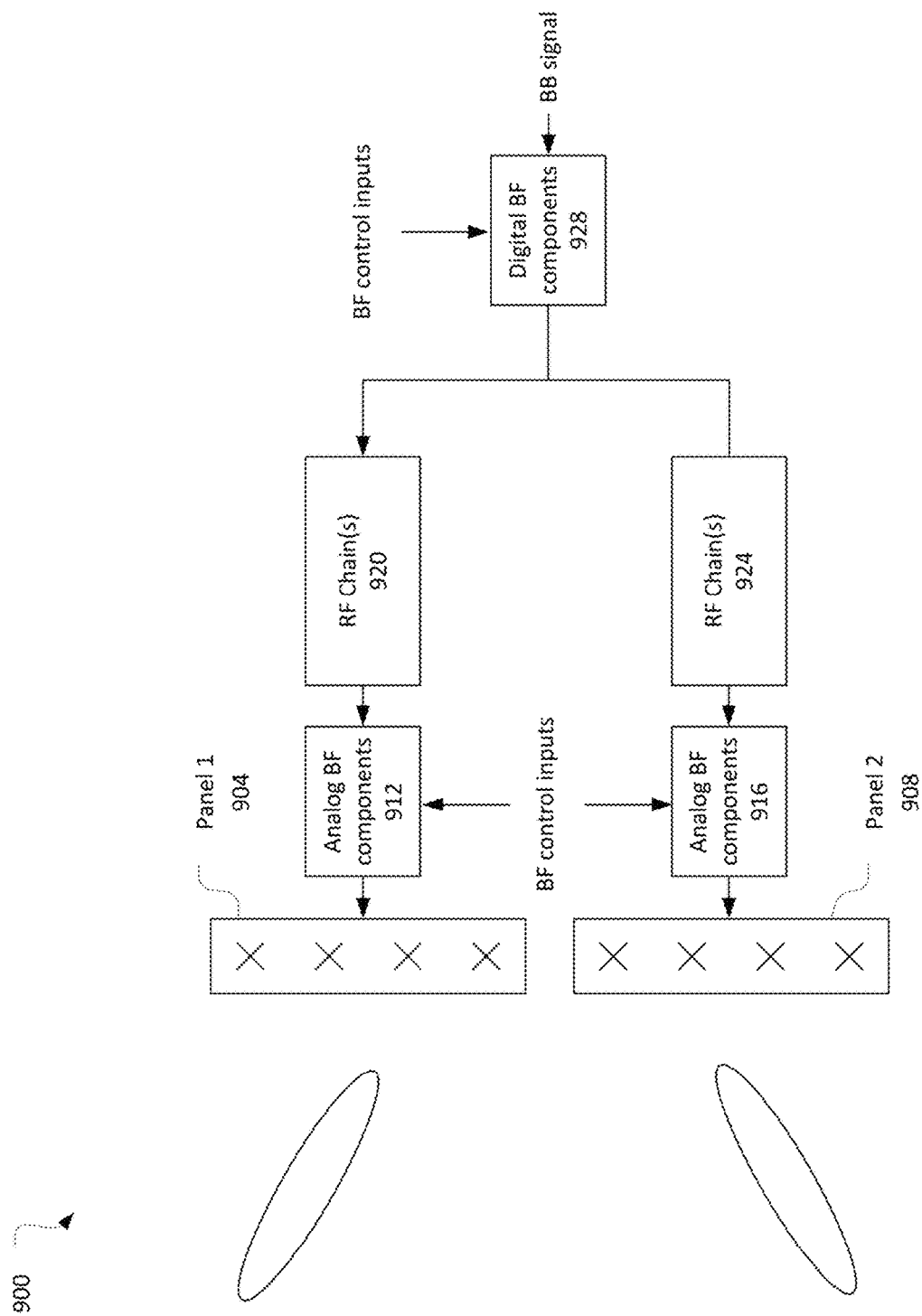
FIG. 9 illustrates beamforming components of a device in accordance with some embodiments.

FIG. 9 illustrates beamforming circuitry 900 in accordance with some embodiments. The beamforming circuitry 900 may include a first antenna panel, panel 1 1004, and a second antenna panel, panel 2 908. Each antenna panel may include a number of antenna elements. Other embodiments may include other numbers of antenna panels.

Digital beamforming (BF) components 928 may receive an input baseband (BB) signal from, for example, a baseband processor such as, for example, baseband processor 1204A of FIG. 12. The digital BF components 928 may rely on complex weights to pre-code the BB signal and provide a beamformed BB signal to parallel radio frequency (RF) chains 920/1124.

Each RF chain 920/1124 may include a digital-to-analog converter to convert the BB signal into the analog domain; a mixer to mix the baseband signal to an RF signal; and a power amplifier to amplify the RF signal for transmission.

The RF signal may be provided to analog BF components 912/1116, which may apply additionally beamforming by providing phase shifts in the analog domain. The RF signals may then be provided to antenna panels 904/1108 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

Figure 10:
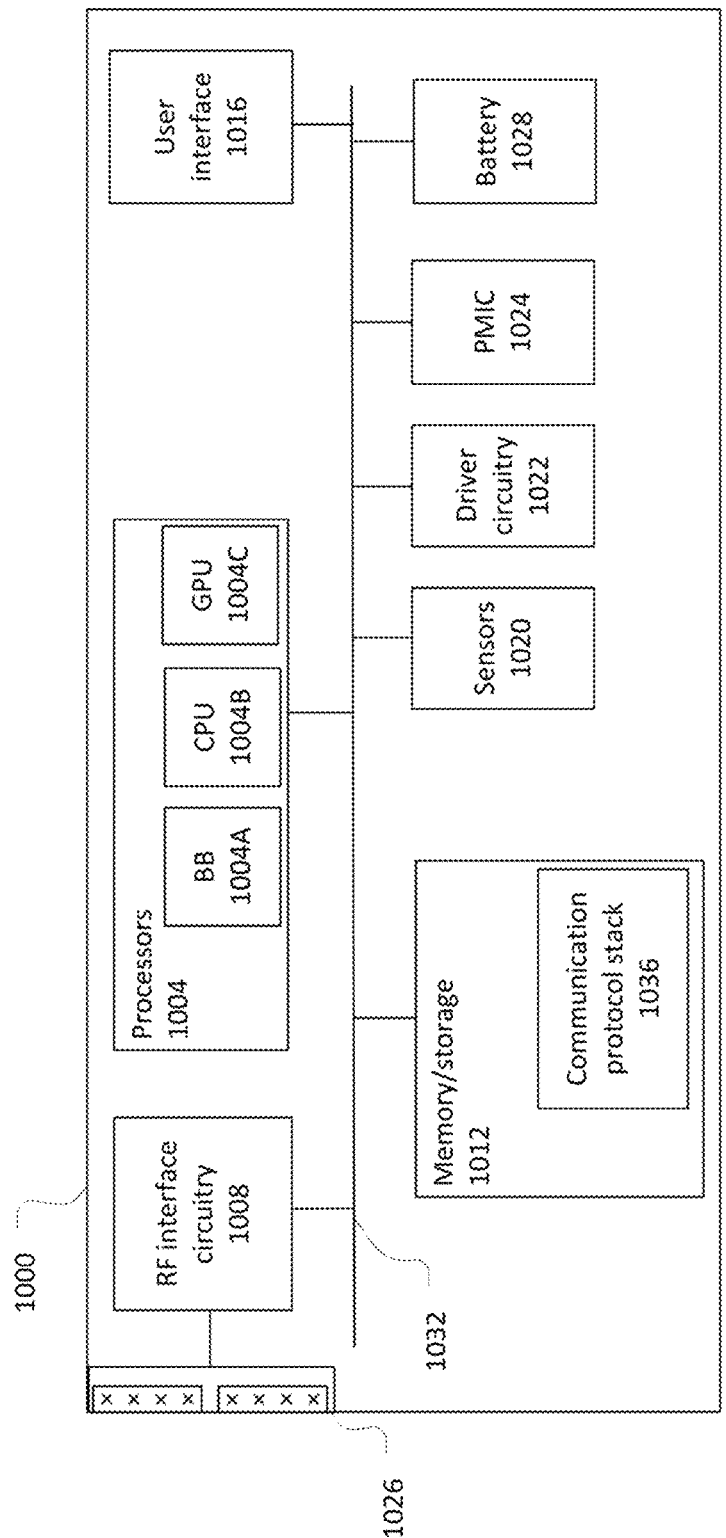
FIG. 10 illustrates a user equipment in accordance with some embodiments.

FIG. 10 illustrates a UE 1000 in accordance with some embodiments. The UE 1000 may be similar to and substantially interchangeable with UE 104 of FIG. 1.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1000 may include processors 1004, RF interface circuitry 1008, memory/storage 1012, user interface 1016, sensors 1020, driver circuitry 1022, power management integrated circuit (PMIC) 1024, antenna structure 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1012 may include one or more non-transitory, computer-readable media that includes instructions (for example, communication protocol stack 1036) that may be executed by one or more of the processors 1004 to cause the UE 1000 to perform various operations described herein. The memory/storage 1012 include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 1100, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000 including DRX as discussed herein.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

Figure 11:
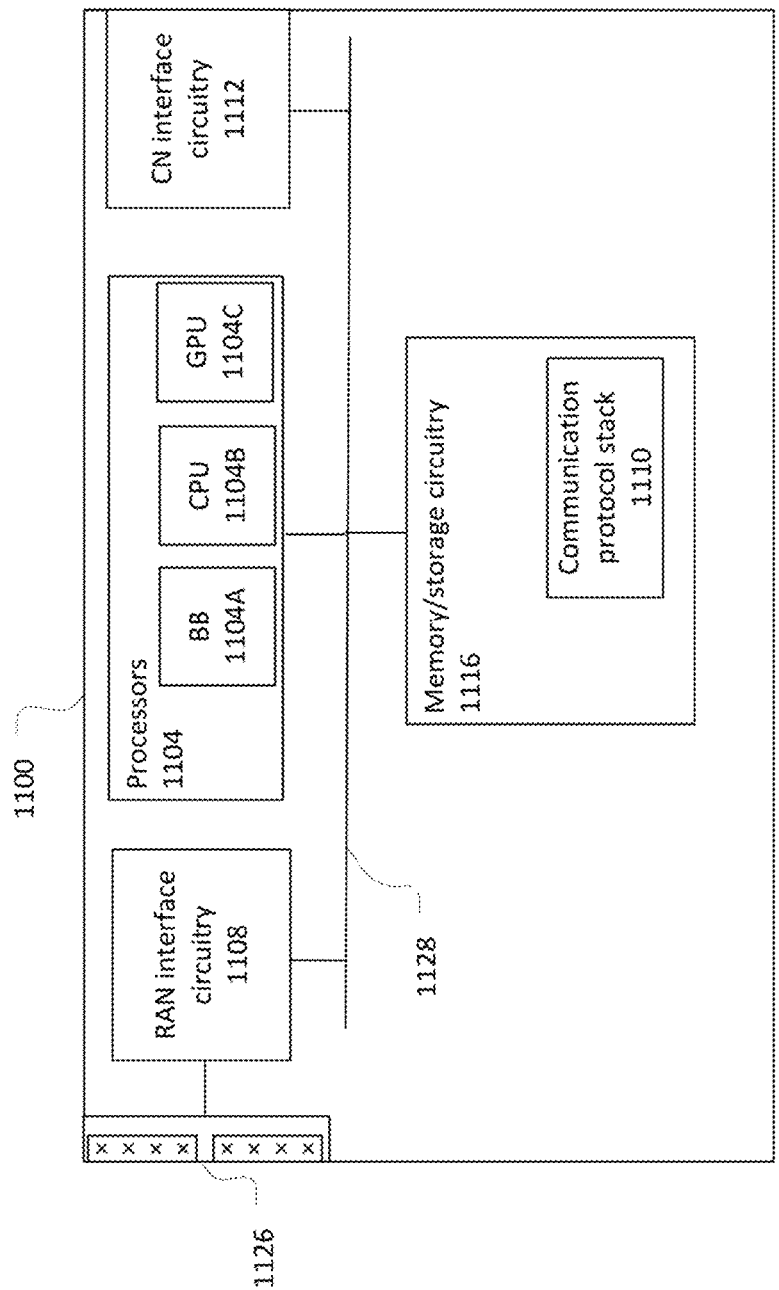
FIG. 11 illustrates a base station in accordance with some embodiments.

FIG. 11 illustrates a gNB 1100 in accordance with some embodiments. The gNB node 1100 may similar to and substantially interchangeable with base station 108 of FIG. 1.

The gNB 1100 may include processors 1104, RF interface circuitry 1108, core network "CN" interface circuitry 1112, memory/storage circuitry 1116, and antenna structure 1126.

The components of the gNB 1100 may be coupled with various other components over one or more interconnects 1128.

The processors 1104, RF interface circuitry 1108, memory/storage circuitry 1116 (including communication protocol stack 1110), antenna structure 1126, and interconnects 1128 may be similar to like-named elements shown and described with respect to FIG. 10.

The CN interface circuitry 1112 may provide connectivity to a core network, for example, a 5$^{th}$ Generation Core network "5GC" using a 5GC-compatible network interface protocol such as carrier Ethernet protocols, or some other suitable protocol. Network connectivity may be provided to/from the gNB 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

In some embodiments, the gNB 1100 may be coupled with TRPs, such as TRPs 112 or 116, using the antenna structure 1126, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a UE, the method comprising: processing one or more downlink control information (DCI) to determine a schedule of a physical uplink shared channel (PUSCH) transmission with a plurality of repetitions, wherein first repetitions of the plurality of repetitions are to be transmitted with a first transmit beam with a first configuration and second repetitions of the plurality of repetitions are to be transmitted with a second transmit beam, wherein the first and the second configurations include different time or frequency allocations or modulation orders; and transmitting the PUSCH transmission with the plurality of repetitions using at least two transmit beams that include the first and second transmit beams.

Example 2 may include the method of example 1 or some other example herein, wherein the one or more DCI includes a single DCI with separate fields to separately indicate the first and second configurations or a single field to jointly indicate the first and second configurations, wherein the first and second configurations are first and second frequency-domain resource allocations (FDRAs), time-domain resource allocations (TDRAs), or modulation and coding schemes (MCSs).

Example 3 may include the method of example 2 or some other example herein, wherein the first and second configurations include first and second FDRAs that define different frequency bandwidths or frequency hopping patterns for the first repetitions and second repetitions.

Example 4 may include the method of example 2 or some other example herein, wherein the first and second configurations include first and second TDRAs, wherein the first TDRA defines first starting symbol and length values that correspond to the first repetitions and the second TDRA defines second starting symbol and length values that correspond to the second repetitions.

Example 5 may include the method of example 2 or some other example herein, wherein the first and second configurations includes first and second MCSs, and the method further comprises: determining, based on the first MCS, a modulation and coding scheme for the first repetitions; determining, based on the first MCS, a transport block size for the plurality of repetitions; determining, based on the second MCS, a modulation order for the second repetitions.

Example 6 may include the method of example 5 or some other example herein, wherein the first MCS comprises a five-bit indicator and the second MCS comprises a two-bit indicator Example 7 may include the method of example 5 or some other example herein, wherein the first MCS comprises a first five-bit indicator and the second MCS comprises a second five-bit indicator.

Example 8 may include the method of example 6 or 7, wherein the instructions, when executed, further cause the UE to: determine, based on the first MCS, a phase tracking reference signal for the first repetitions.

Example 9 may include the method of example 1 or some other example herein, wherein the first configuration includes a first uplink resource allocation for the first repetitions and the second configuration includes a second uplink resource allocation for the second repetitions and the method further comprises: determining a modulation and coding scheme (MCS); and determining a transport block size for the plurality of repetitions based on the MCS and the first uplink resource allocation.

Example 10 may include the method of example 1 or some other example herein, wherein the one or more DCI comprises a first stage DCI and a second stage DCI, wherein the first stage DCI is to provide control signaling for the first repetitions and the second stage DCI is to provide control signaling for the second repetitions.

Example 11 may include the method of example 1 or some other example herein, wherein the one or more DCI comprises at least two DCI that respectively correspond to the at least two transmit beams and the method further comprises: processing a radio resource control parameter to enable operation using the at least two DCI; and receiving the at least two DCI before a first repetition of the plurality of PUSCH repetitions.

Example 12 may include a method of operating a UE, the method comprising storing radio resource control (RRC) configurations; receiving one or more downlink control information (DCI) to schedule a physical uplink shared channel (PUSCH) with a plurality of repetitions over two or more beams; and transmitting, based on the one or more DCI and the RRC configurations, first repetitions of the plurality of repetitions with a first configuration and second repetitions of the plurality of repetitions with a second configuration, wherein the first and second configurations include different time or frequency allocations or modulation orders.

Example 13 may include the method of example 12 or some other example herein, wherein the one or more DCI includes a single DCI with separate fields to separately indicate the first and second configurations or a single field to jointly indicate the first and second configurations, wherein the first and second configurations are first and second frequency-domain resource allocations (FDRAs), time-domain resource allocations (TDRAs), or modulation and coding schemes (MCSs).

Example 14 may include the method of example 13 or some other example herein, wherein the first and second configurations include first and second FDRAs that define different frequency bandwidths or frequency hopping patterns for the first repetitions and second repetitions.

Example 15 may include the method of example 13 or some other example herein, wherein the first and second configurations include first and second TDRAs, wherein the first TDRA defines first starting symbol and length values that correspond to the first repetitions and the second TDRA defines second starting symbol and length values that correspond to the second repetitions.

Example 16 may include the method of example 15 or some other example herein, wherein the method further comprises: receiving RRC signaling with a PUSCH time domain resource allocation information (TDRA) (IE) to provide the first and second start symbol and length values; and storing the RRC configurations based on the PUSCH TDRA IE.

Example 17 may include the method of example 13 or some other example herein, wherein the first and second configurations includes first and second MCSs, wherein the method further comprises: determining, based on the first MCS, a modulation and coding scheme for the first repetitions; determining, based on the first MCS and an uplink resource allocation for the first repetitions, a transport block size for the plurality of repetitions; and determining, based on the second MCS, a modulation order for the second repetitions Example 17.1 may include the method of example 17 or some other example herein, wherein the first MCS comprises a first five-bit indicator and the second MCS comprises a second five-bit indicator or a two-bit indicator.

Example 17.2 may include the method of example 17.1 or some other example herein, further comprising: determining, based on the first MCS, a phase tracking reference signal for the first repetitions.

Example 18 includes a method of operating a base station, the method comprising: transmitting radio resource control (RRC) signaling to configure a user equipment with physical uplink shared channel (PUSCH) allocation information; transmitting one or more downlink control information (DCI) to schedule a PUSCH transmission with a plurality of repetitions on at least two beams based on the PUSCH allocation information, wherein first repetitions are to be scheduled for transmission on a first beam with a first configuration and second repetitions are to be scheduled for transmission on a second beam with a second configuration, wherein the first and second configurations include different time or frequency allocations or modulation orders; and receiving the PUSCH transmission from the user equipment.

Example 19 may include the method of example 18 or some other example herein, wherein the PUSCH allocation information comprises a PUSCH time domain resource allocation information element that includes a plurality of start symbols and length values, the first configuration is to indicate first start symbol and length values from the plurality of start symbols and length values for the first repetitions, and the second configuration is to indicate second start symbol and length values from the plurality of start symbols and length values for the second repetitions.

Example 20 may include the method of example 19 or some other example herein, wherein the first and second configurations are first and second frequency-domain resource allocations (FDRAs), time-domain resource allocations (TDRAs), or modulation and coding schemes (MCSs).

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
process one or more downlink control information (DCI) to determine a schedule of a physical uplink shared channel (PUSCH) transmission with a plurality of repetitions, wherein first repetitions of the plurality of repetitions are to be transmitted with a first transmit beam having a first configuration and second repetitions of the plurality of repetitions are to be transmitted with a second transmit beam having a second configuration, wherein the first and the second configurations include different time or frequency allocations or modulation orders;
determine a transport block size for each repetition of the plurality of repetitions based on a 5-bit modulation and coding scheme (MCS) and a resource allocation for a first repetition of the plurality of repetitions; and
generate the PUSCH transmission with the plurality of repetitions using the transport block size, the resource allocation for the first repetition of the plurality of repetitions, and at least two transmit beams that include the first and second transmit beams.

2. The one or more non-transitory computer-readable media of claim 1, wherein the one or more DCI comprises a first stage DCI and a second stage DCI, wherein the first stage DCI is to provide control signaling for the first repetitions and the second stage DCI is to provide control signaling for the second repetitions.

3. The one or more non-transitory computer-readable media of claim 1, wherein the one or more DCI comprises at least two DCI that respectively correspond to the at least two transmit beams and the instructions, when executed, further cause the processing circuitry to:
process a radio resource control parameter to enable operation using the at least two DCI; and
process the at least two DCI before a first repetition of the plurality of PUSCH repetitions.

4. One or more non-transitory computer-readable media having instructions that, when executed, cause processing circuitry to:
process one or more downlink control information (DCI) to determine a schedule of a physical uplink shared channel (PUSCH) transmission with a plurality of repetitions, wherein first repetitions of the plurality of repetitions are to be transmitted with a first transmit beam having a first configuration and second repetitions of the plurality of repetitions are to be transmitted with a second transmit beam having a second configuration, wherein the first and the second configurations include different time or frequency allocations or modulation orders; and generate the PUSCH transmission with the plurality of repetitions using at least two transmit beams that include the first and second transmit beams;

wherein the one or more DCI includes a single DCI with separate fields to separately indicate the first and second configurations or a single field to jointly indicate the first and second configurations, wherein the first and second configurations are first and second frequency-domain resource allocations (FDRAs), time-domain resource allocations (TDRAs), or modulation and coding schemes (MCSs);

wherein the first and second configurations includes first and second MCSs, wherein the instructions, when executed, further cause the processing circuitry to:

determine, based on the first MCS, a modulation and coding scheme for the first repetitions;

determine, based on the first MCS, a transport block size for the plurality of repetitions;

determine, based on the second MCS, a modulation order for the second repetitions;

wherein the first MCS comprises a five-bit indicator and the second MCS comprises a two-bit indicator or the first MCS comprises a first five-bit indicator and the second MCS comprises a second five-bit indicator.

5. The one or more non-transitory computer-readable media of claim 4, wherein the first and second configurations include first and second FDRAs that define different frequency bandwidths or frequency hopping patterns for the first repetitions and second repetitions.

6. The one or more non-transitory computer-readable media of claim 4, wherein the first and second configurations include first and second TDRAs, wherein the first TDRA defines first starting symbol and length values that correspond to the first repetitions and the second TDRA defines second starting symbol and length values that correspond to the second repetitions.

7. The one or more non-transitory computer-readable media of claim 4, wherein the instructions, when executed, further cause theme processing circuitry to: determine, based on the first MCS, a phase tracking reference signal for the first repetitions.

8. A baseband circuitry comprising:

memory to store radio resource control (RRC) configurations; and processing circuitry coupled with the memory, the processing circuitry to:

receive one or more downlink control information (DCI) to schedule a physical uplink shared channel (PUSCH) with a plurality of repetitions over two or more beams;

determine a transport block size for each repetition of the plurality of repetitions based on a 5-bit modulation and coding scheme (MCS) and a resource allocation for a first repetition of the plurality of repetitions; and generate, based on the one or more DCI and the RRC configurations and the transport block size, first repetitions of the plurality of repetitions with a first configuration and second repetitions of the plurality of repetitions with a second configuration, wherein the first and second configurations include different time or frequency allocations or modulation orders.

9. The baseband circuitry of claim 8, wherein the one or more DCI includes a single DCI with separate fields to separately indicate the first and second configurations or a single field to jointly indicate the first and second configurations, wherein the first and second configurations are first and second frequency-domain resource allocations (FDRAs), time-domain resource allocations (TDRAs), or modulation and coding schemes (MCSs).

10. The baseband circuitry of claim 9, wherein the first and second configurations include first and second FDRAs that define different frequency bandwidths or frequency hopping patterns for the first repetitions and second repetitions.

11. The baseband circuitry of claim 9, wherein the first and second configurations include first and second TDRAs, wherein the first TDRA defines first starting symbol and length values that correspond to the first repetitions and the second TDRA defines second starting symbol and length values that correspond to the second repetitions.

12. The baseband circuitry of claim 11, wherein the processing circuitry is further to:

process RRC signaling with a PUSCH time domain resource allocation information (TDRA) (IE) to provide the first and second start symbol and length values; and store the RRC configurations based on the PUSCH TDRA IE.

13. A method comprising:

generating radio resource control (RRC) signaling to configure a user equipment with physical uplink shared channel (PUSCH) allocation information;

generating one or more downlink control information (DCI) to schedule a PUSCH transmission with a plurality of repetitions on at least two beams based on the PUSCH allocation information, wherein first repetitions are to be scheduled for transmission on a first beam with a first configuration and second repetitions are to be scheduled for transmission on a second beam with a second configuration, wherein the first and second configurations include different time or frequency allocations or modulation orders, and wherein each repetition of the plurality of repetitions has a transport block size based on a 5-bit modulation and coding scheme (MS); and processing the PUSCH transmission from the user equipment.

14. The method of claim 13, wherein the PUSCH allocation information comprises a PUSCH time domain resource allocation information element that includes a plurality of start symbols and length values, the first configuration is to indicate first start symbol and length values from the plurality of start symbols and length values for the first repetitions, and the second configuration is to indicate second start symbol and length values from the plurality of start symbols and length values for the second repetitions.

* * * * *